United States Patent Office 3,503,159
Patented Mar. 31, 1970

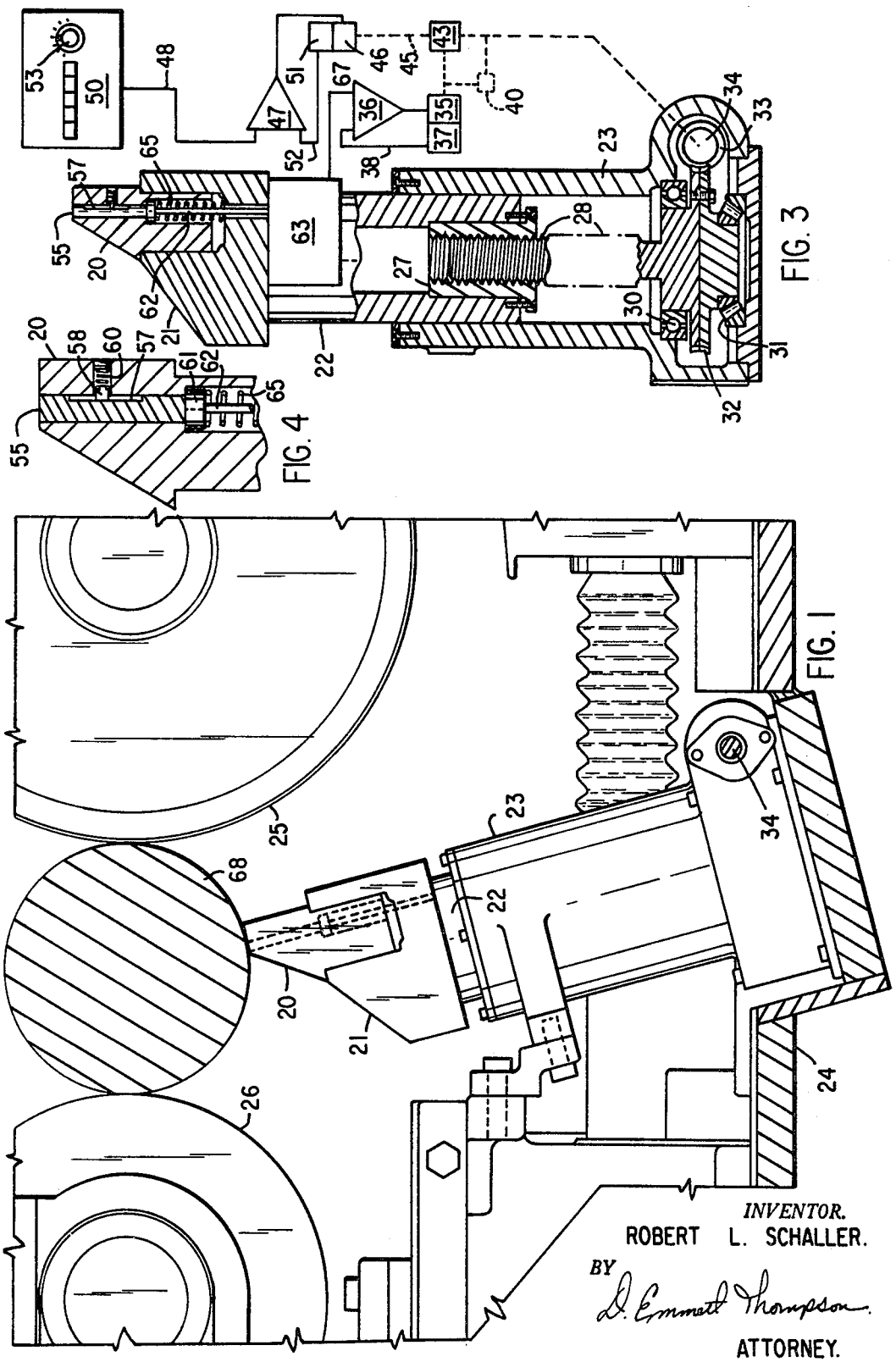

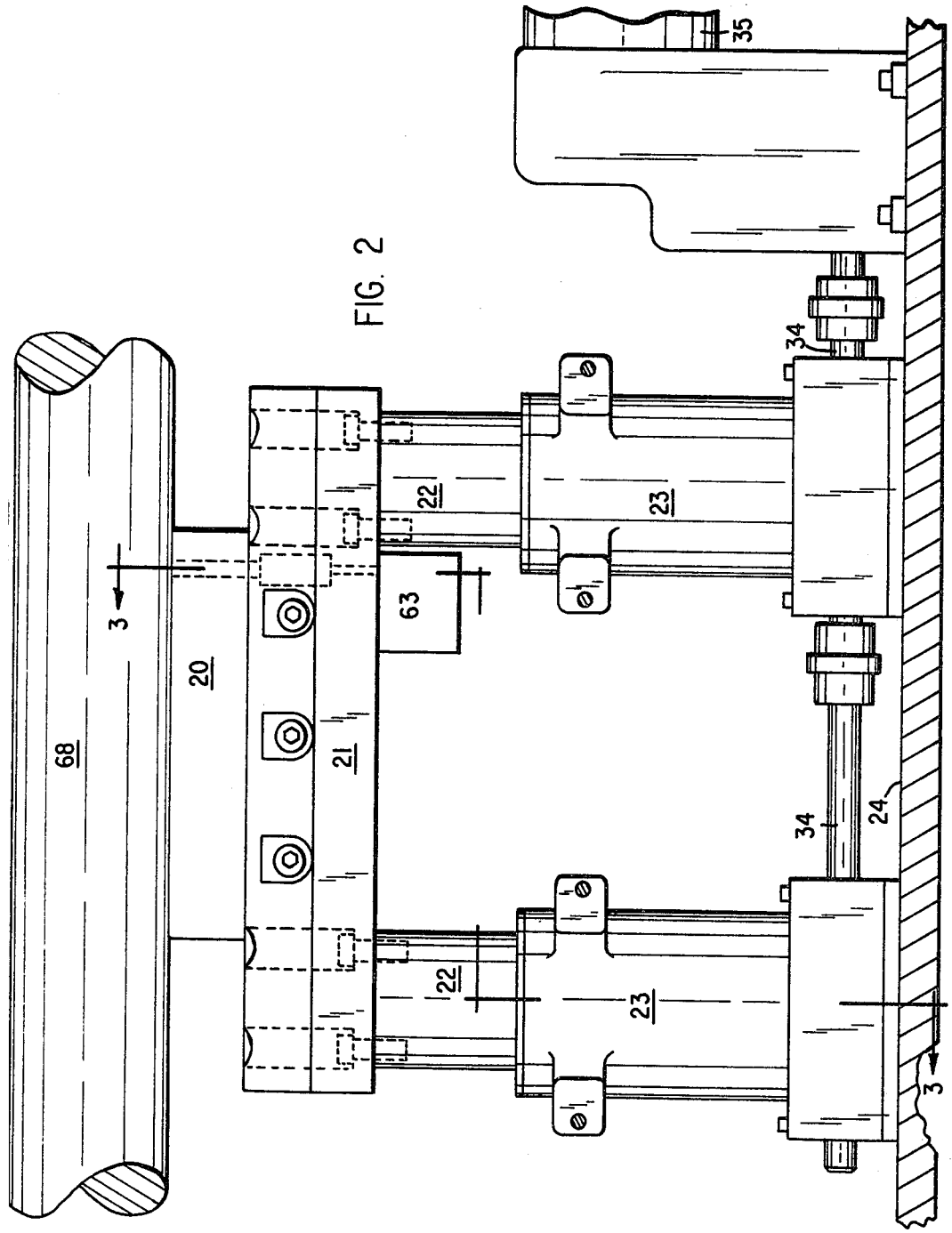

3,503,159
AUTOMATIC WEAR COMPENSATING MECHANISM FOR WORK REST IN CENTERLESS GRINDING MACHINES
Robert L. Schaller, Camillus, N.Y., assignor to Engelberg, Inc., Liverpool, N.Y., a corporation of Delaware
Filed Jan. 9, 1968, Ser. No. 696,523
Int. Cl. B24b 41/06, 5/00, 5/18
U.S. Cl. 51—238
3 Claims

ABSTRACT OF THE DISCLOSURE

A servo system is employed to effect vertical adjustment of the work rest. A contact element of wear resisting material is mounted in the work rest blade for movement by the work piece as wear is occasioned on the blade. This movement is transmitted to a linear transducer, the output of which is varied proportionately to the extent of movement of the contact element. The output of the transducer is connected to the servo system, which also includes the usual position sensor with feed back.

BACKGROUND OF THE INVENTION

In centerless grinding machines, it is necessary to consistently maintain the axis of the work piece being ground at a preselected point in order to maintain the dimension of all work pieces uniform. In grinding work pieces of certain materials, a work rest blade can not be formed of hard wear resistant material, as blades of such material deface the work piece, or cause a galling thereof. In grinding work pieces of such materials, it is common practice to use a work rest blade formed of relatively soft material, such as cast iron, in order to avoid damage to the work piece. Such blades are subject to wear by the revolving work piece, especially if the work piece is of substantial diameter and accordingly, of substantial weight. Obviously, as the upper surface of the work rest blade wears away, the axis of the work piece is lowered, resulting in a variation in the diameter of the ground work piece.

BRIEF SUMMARY OF THE INVENTION

This invention has an object automatic wear compensating mechanism which is operable to produce continuous infinitely small changes in the position of the work rest blade comparable to the wearing away of the surface thereof.

The work rest is initially adjusted vertically to properly position the work rest for a given diameter work piece. A contact element of high wear resistant material is mounted in the work rest blade and is yieldingly urged against the under side of the work piece positioned on the blade. As the upper surface of the blade wears away, the element is moved downwardly, this movement being coupled to a linear transducer mounted in the rest structure. The output signal of the transducer is connected to a servo mechanism to effect readjustment of the work rest blade comparable to the wear occasioned in the blade, whereby the predetermined grinding axis of the work piece is accurately maintained.

BRIEF DESCRIPTION OF DRAWINGS

FIGURE 1 is an end elevational view of a work rest structure embodying my invention.

FIGURE 2 is a front elevational view.

FIGURE 3 is a view taken on line 3—3, FIGURE 2, and includes a schematic diagram of the control circuitry.

FIGURE 4 is an enlarged sectional view of the upper portion of the work rest structure shown in FIGURE 3.

DETAILED DESCRIPTION

In general arrangement, the work rest structure is similar to that disclosed in my copending application, Ser. No. 631,568, filed Mar. 30, 1967.

The work piece supporting blade 20 is detachably mounted in a support 21 fixed to the upper ends of rams 22. The rams 22 are mounted for vertical sliding movement in housings 23 which are fixedly mounted in the frame structure 24 of the centerless grinding machine, the support and blade being positioned intermediate the contact wheel 25 and regulating wheel 26. The rams 22 are provided with nuts 27 to receive jack screws 28 journalled at their lower ends in bearings 30, 31. A worm gear 32 is fixed to the lower end of each screw and is arranged in mesh with a worm 33 fixed to a shaft 34. The shafts 34 are coupled together and are rotated by a servo actuator 35.

The servo system is of conventional arrangement, including an amplifier 36 and a position sensor 37 having a feed back line 38 to the amplifier 36. The actuator 35 may be connected directly to the shaft 34 through a clutch 40. With the clutch disengaged, the shaft 34 may be rotated manually to initially move the work rest to proper position for the grinding of a work piece of given diameter. Thereafter, the clutch 40 is engaged and rotation is imparted to the shaft 34 by the actuator 35 to effect readjustment of the work rest necessary to compensate for wear occasioned in the blade 20, as will be hereinafter more fully explained.

Preferably, the actuator 35 is connected to a differential mechanism 43, the output of which is connected to the shaft 34, and the second input shaft 45 is connected to a servo actuator 46, which is powered from an amplifier 47 obtaining a command signal through line 48 from a position setter 50. A position sensor 51 is provided and has a feed back 52 to the amplifier 47. With this arrangement, the work rest can be initially set for a given diameter of work by operation of the dial 53 on the position setter 50.

A contact element 55 is mounted for vertical sliding movement in the blade 20. In the arrangement shown in FIGURES 3 and 4, the contact element 55 is in the form of a cylindrical pin formed of high wear resistant material formed with a flattened area 57 on one side engaged by a plug 58 which is yieldingly pressed against the contact element by spring 60. The flattened surface 57 provides for limited vertical movement of the contact element. The spring pressed plug 58 yieldingly restrains vertical movement of the element.

The lower end of the contact element engages a collar 61 on the upper end of a stem 62 which extends downwardly into a linear variable transducer 63 mounted on the underside of the support 21. If the transducer does not include means for maintaining the stem and collar 61 in up position, a helical compression spring 65 may be employed for that purpose.

As the top surface of the blade 20 is worn away by the revolving work piece, the contact element 55 will be moved downwardly by the work piece, actuating the transducer 63. The output of the transducer is connected to the amplifier 36 by line 67. The output of the transducer 63 is proportional to the extent of the downward movement of the contact element 55, and the servo amplifier 36 is proportionately responsive to such change, with the result that the actuator 35 will effect elevation of the support 21 to the same extent as the downward movement of the contact element.

Accordingly, as the upper surface of the work rest blade 20 wears away, the blade is readjusted upwardly a like amount, thereby maintaining the axis of the work piece 68 constant.

What I claim is:

1. A work rest structure for centerless grinding machines comprising a support, a rest blade detachably mounted on said support, a contact element formed of wear resisting material mounted in said blade for limited vertical movement therein, said contact element contacting the work piece and being movable downwardly thereby upon wear occasioned in the work engaging surface of said blade, a linear variable transducer fixedly mounted relative to said blade, said contact element being operatively connected to said transducer for actuation thereof upon movement of said contact element, the output of said transducer being proportional to the movement of said contact element, a servo system including a servo actuator, motion transmitting means operatively connecting said actuator to said support for vertical adjustment thereof by said actuator, the output of said transducer being connected to said servo system and said system being proportionately responsive to said output.

2. A work rest structure for centerless grinding machines as set forth in claim 1, wherein said contact element is mounted for vertical sliding movement in said blade, and means yieldingly restraining movement of said contact element.

3. A work rest structure as set forth in claim 1, wherein said motion transmitting means includes differential mechanism.

References Cited

UNITED STATES PATENTS

| | | | |
|---|---|---|---|
| 1,585,984 | 5/1926 | Heim | 51—238 X |
| 2,449,488 | 9/1948 | Krueger | 51—238 |

HAROLD D. WHITEHEAD, Primary Examiner

U.S. Cl. X.R.

51—103